US008988200B2

(12) United States Patent
Lee et al.

(10) Patent No.: US 8,988,200 B2
(45) Date of Patent: Mar. 24, 2015

(54) PRINTED LABEL-TO-RFID TAG DATA TRANSLATION APPARATUS AND METHOD

(75) Inventors: Yong Hyun Lee, Milpitas, CA (US); Toan Tran, Milpitas, CA (US)

(73) Assignee: Hana Micron America, Inc., Milpitas, CA (US)

(*) Notice: Subject to any disclaimer, the term of this patent is extended or adjusted under 35 U.S.C. 154(b) by 509 days.

(21) Appl. No.: 13/210,108

(22) Filed: Aug. 15, 2011

(65) Prior Publication Data

US 2013/0043983 A1 Feb. 21, 2013

(51) Int. Cl.
*H04Q 5/22* (2006.01)
*G06K 1/18* (2006.01)

(52) U.S. Cl.
CPC ........................................ *G06K 1/18* (2013.01)
USPC ..................... 340/10.51; 340/10.52; 340/673; 340/676; 235/384

(58) Field of Classification Search
CPC .......... G06K 7/10435; G06K 7/10455; G06K 7/10366; G06K 7/10821; G06K 19/0723; G06K 19/041
USPC ................ 340/10.1–10.3, 10.5, 10.51, 10.52, 340/3.22, 3.23, 3.24, 3.42, 673–676; 235/375–385, 462.17–462.18
See application file for complete search history.

(56) References Cited

U.S. PATENT DOCUMENTS

| 6,104,291 | A  | * | 8/2000  | Beauvillier et al. ........ 340/572.1 |
|-----------|----|---|---------|--------------------------------------|
| 7,031,946 | B1 | * | 4/2006  | Tamai et al. ..................... 705/67 |
| 7,114,655 | B2 | * | 10/2006 | Chapman et al. ......... 235/462.01 |
| 7,273,165 | B2 | * | 9/2007  | Satake et al. ................... 235/375 |
| 2002/0115341 | A1 | * | 8/2002 | Hein et al. ...................... 439/495 |
| 2005/0029350 | A1 | * | 2/2005 | Jusas et al. ..................... 235/451 |
| 2005/0116034 | A1 | * | 6/2005 | Satake et al. ................... 235/432 |
| 2005/0230479 | A1 | * | 10/2005 | Chapman et al. ......... 235/462.13 |
| 2006/0030968 | A1 | * | 2/2006 | Ko et al. ........................ 700/213 |
| 2009/0307529 | A1 |  | 12/2009 | Kim |
| 2010/0141394 | A1 | * | 6/2010 | Sugiyama ..................... 340/10.4 |
| 2012/0319821 | A1 | * | 12/2012 | Karttaavi et al. ............ 340/10.1 |

* cited by examiner

*Primary Examiner* — Firmin Backer
*Assistant Examiner* — Nay Tun
(74) *Attorney, Agent, or Firm* — Invent Capture, LLC.; Samuel S. Cho (57) ABSTRACT

An apparatus and a method for translating, transcribing, and/or converting a printed label on a surface of an RFID tag into electronic data, which are writable to a non-volatile storage inside the RFID tag, are disclosed. In one example, the apparatus comprises an image reader for scanning a printed label on the surface of an RFID tag, a UHF antenna module, a UHF tag access module for reading from or writing into the RFID tag, and a computer interface to display various parameters and control the apparatus. A tag-holding plate containing batches of RFID tags can be brought to an access range of the image reader using a conveyor belt or another moving mechanism. Once positioned within the access range, the apparatus can read and translate a printed label on a RFID tag and write the converted electronic data into a non-volatile storage inside the RFID tag.

19 Claims, 6 Drawing Sheets

| | Tag ID | Type | DOB | Gender | Owner | Vaccine Records | Other Information |
|---|---|---|---|---|---|---|---|
| 515 | AB001 | | | | | | |
| | AB002 | | | | | | |
| | AB003 | | | | | | |
| 517 | AB004 | | | | | | |
| | AB005 | | | | | | |
| | AB006 | | | | | | |

An embodiment of a system-level data flow diagram

PRINTED LABEL-TO-RFID TAG DATA TRANSLATION APPARATUS AND METHOD

BACKGROUND OF THE INVENTION

The present invention generally relates to data translation, transcription, and/or conversion from a printed form to an electronic form. More specifically, various embodiments of the present invention relate to one or more printed label-to-RFID tag data translation apparatuses and methods.

RFID tags are increasingly becoming standard forms of identification for livestock, agricultural produce, and other food sources and products. In case of livestock farms, a conventional form of identifying an animal in a livestock herd was attaching a paper tag with an identification number on the animal's body part. If the paper tag is to be associated with the animal's vaccination history or any other pertinent dynamically-changing information, it is common practice to attach little paper tabs containing snippets of information to the paper tag itself, which make livestock farm management cumbersome, outdated, and awkward for any computerized information management of animal-specific and/or farm-specific data.

Using an radio-frequency identification (RFID) tag to store animal-specific and farm-specific information enables electronic data storage and retrieval using an RFID reader device. Using RFID tags also make food source information tracking, contamination/disease breakout control, and/or transaction history tracking simpler and easier for a livestock farm or an agricultural producer by leveraging electronic data storage and retrieval capabilities of today's modern information technology (IT) systems.

However, in many cases, conventional RFID tags have to be initialized serially (i.e. one by one), before they are first attached to animals or agricultural products. Because agricultural and livestock regulations of many countries require a unique identification code (i.e. a UID code) to be issued in association with a government IT systems, a typical data initialization procedure of an animal RFID tag or an agricultural product RFID tag requires printing out a UID label and attaching it to a surface of the RFID tag, or printing the UID label directly on a surface of the RFID tag as a silkscreen. Furthermore, in conventional data initialization of RFID tags for livestock and agricultural industry, data initialization also requires a farm worker or another assistant to transcribe the UID code as an electronic UID inside a non-volatile data storage in the RFID tag in a serialized fashion (i.e. one tag after another).

The conventional serialized data initialization procedure for RFID tags is a manual task requiring a farm worker's attention for each RFID tag. Such manual and serialized methods are generally inefficient to handle a high-capacity data initialization of RFID tags for a high-volume livestock farming or a large agricultural operation. Therefore, it may be desirable to devise a novel apparatus which can provide a mostly or entirely automated and efficient data initialization for RFID tags. Furthermore, it may be also desirable to devise a novel method which can provide a mostly or entirely automated and efficient data initialization for RFID tags. In addition, it may also be desirable to improve speed and accuracy of this apparatus and related method with additional novel features.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an apparatus for printed label-to-RFID tag data translation is disclosed. This apparatus comprises: an image reader configured to scan printed information on a surface of a particular RFID tag to convert the printed information to electronic data; a computer interface operatively connected to the image reader and a computer, wherein the computer interface is configured to route the electronic data and any other desirable data among the image reader, the computer, and/or a UHF tag access module; the UHF tag access module operatively connected to a UHF antenna module, wherein the UHF tag access module is configured to send a data write instruction to a non-volatile storage inside the particular RFID tag via the UHF antenna module, wherein the data write instruction is used for transmission of at least a portion of the electronic data or a transformed dataset of the electronic data from the image reader and/or the computer; a tag-holding plate configured to hold the particular RFID tag in a tag slot formed on the tag-holding plate, wherein the tag-holding plate is placed on a conveyor belt, and wherein the tag slot in the tag-holding plate can be brought within an access range of the image reader and the UHF tag antenna module by activating the conveyor belt; the UHF antenna module located above the tag-holding plate, wherein the UHF antenna module is configured to transmit the data write instruction to the non-volatile storage inside the particular RFID tag, and is also configured to receive some data from the particular RFID tag in case of a data read instruction; and the computer executing an application program on its CPU and a memory unit, wherein the application program is configured to control a particular behavior of at least one of the image reader, the computer interface, UHF tag access module, the tag-holding plate, the conveyer belt, and the UHF antenna module.

Furthermore, in another embodiment of the invention, a method of translating a printed label to electronic data stored inside a particular RFID tag is disclosed. This method comprises the steps of: positioning a tag-holding plate within an access range of an image reader and a UHF antenna module; initiating scanning of a printed label on a surface of the particular RFID tag placed in a tag slot of the tag-holding plate by activating the image reader; transmitting scanned data from the image reader to a computer operatively connected to the image reader; using an image recognition program executing on a CPU and a memory unit of the computer to process and/or convert the scanned data to generate electronic data writable to a non-volatile storage inside the particular RFID tag; and writing at least some portions of the electronic data into the non-volatile storage inside the particular RFID tag using a UHF tag access module and the UHF antenna module.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more apparatuses and methods for translation of data from a printed label to electronic data storable inside the RFID tag. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment, can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "livestock" is defined as farm animals raised for use and/or profit. The term "livestock" can include, but are not limited to, cattle, sheep, pigs, goats, horses, donkeys, mules, and poultry (e.g. chickens, ducks, turkeys, and geese).

Furthermore, for the purpose of describing the invention, a term "agricultural produce" is defined as a food product such as grains, vegetables, fruits, fish, and processed foods, which may originate from a farm and/or a food processing plant.

In addition, for the purpose of describing the invention, a term "radio frequency identification," or RFID, is defined as a wireless signal-based identification of a wirelessly-accessible tag (e.g. an "RFID tag") using a wirelessly-accessible tag reader (e.g. an "RFID tag access module"). In a preferred embodiment of the invention, an RFID tag typically contains a non-volatile storage (e.g. a non-volatile memory unit, another data storage unit, and etc.) configured to be accessed by the RFID tag access module, an RF antenna (e.g. a UHF antenna module) operatively connected to the RFID tag access module, or another tag information access device for data retrieval (i.e. read function) or data storage (i.e. write function). Furthermore, examples of RFID tag access module include, but are not limited to UHF (ultra high frequency) tag access modules and LF (low frequency) tag access modules.

In general, ultra high frequency (UHF) tag access modules are capable of achieving longer read/write ranges (e.g. up to several meters) and multiple RFID tag read/write capabilities, which were difficult to achieve in conventional low frequency (LF)-based RFID devices exhibiting shorter read/write ranges (e.g. approximately up to 30 centimeters) and single tag scan functionalities. In a preferred embodiment of the invention, the UHF range for the RFID tag access module is defined by ISO/IEC 18000-6 air interface standard, which utilizes an operating frequency range of 860 MHz~960 MHz. In another embodiment of the invention, the UHF operating frequency range may be defined more broadly as 300 MHz~3 GHz. In general, the conventional LF operating frequencies are below the UHF RFID tag access module operating frequency ranges.

Furthermore, for the purpose of describing the invention, a term "printed label" is defined as an image including at least one of a barcode, a QR code, an alphanumeric code, and/or any other printed information, which can be operatively attached to a surface of an RFID tag, or directly printed on the surface of the RFID tag as a silkscreen.

In addition, for the purpose of describing the invention, a term "image reader" is defined as a device capable of electronically scanning printed information, wherein the printed information may be a barcode, a QR code, an alphanumeric code, and/or any other printed information.

Moreover, for the purpose of describing the invention, a term "data translation" is defined as an act of transcribing, transforming, and/or converting one data form to another data form. In a preferred embodiment of the invention, the data translation involves converting printed information on a printed label of an RFID tag to electronic data storable in a non-volatile storage inside the RFID tag.

One aspect of an embodiment of the present invention is providing an apparatus or a system which can substantially automate data initialization of RFID tags, especially when a speedy and efficient data initialization process is desired for numerous RFID tags.

Another aspect of an embodiment of the present invention is providing a method which achieves substantially-automated data initialization of RFID tags, especially when a speedy and efficient data initialization process is desired for numerous RFID tags.

Yet another aspect of an embodiment of the present invention is improving the accuracy of the speedy and efficient data initialization process as disclosed in one or more embodiments of the present invention.

Figure 1:
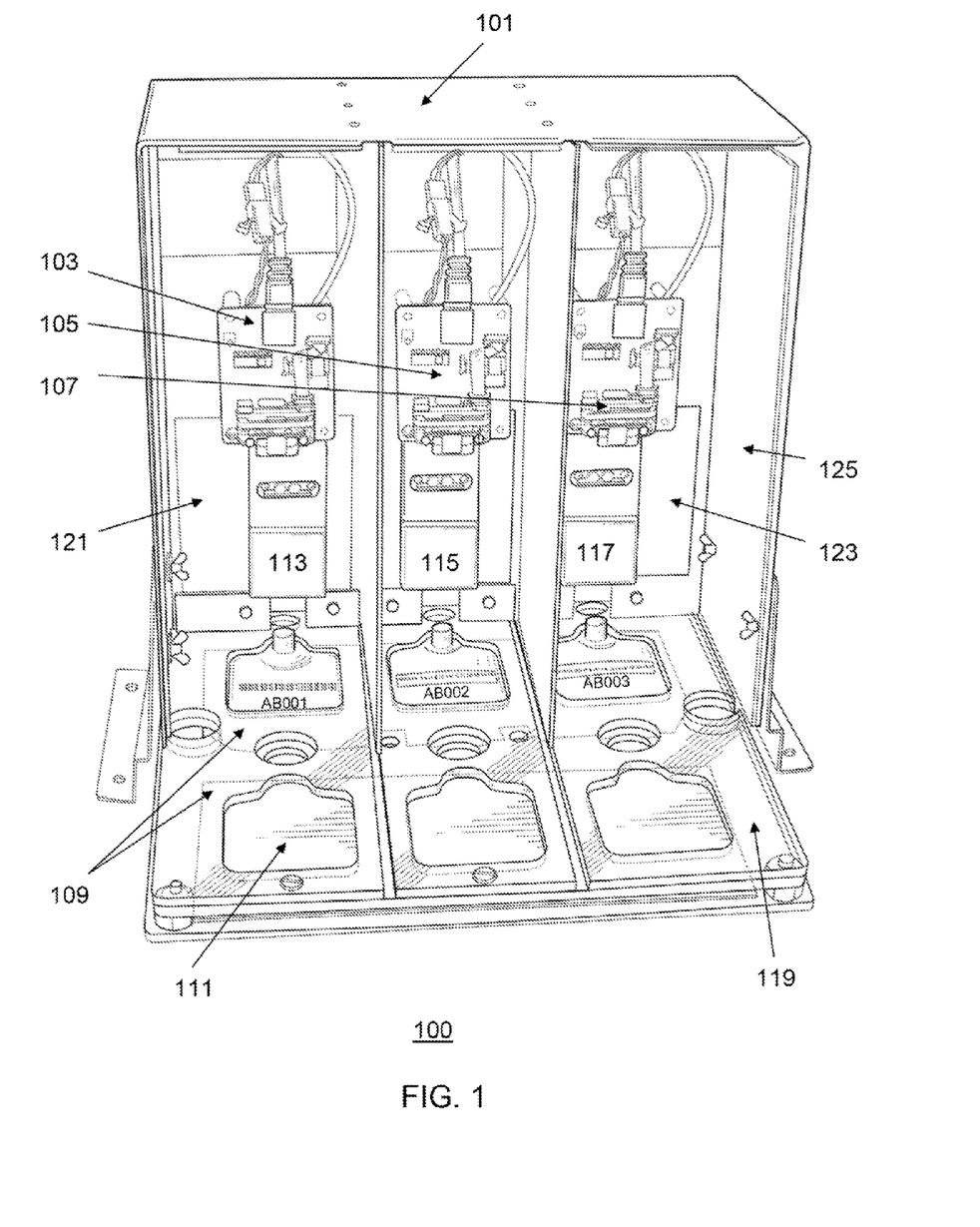
FIG. 1 shows a perspective diagram of an image reader and UHF antenna box from a printed-label-to-RFID tag data translation apparatus, in accordance with an embodiment of the invention.

FIG. 1 shows a perspective diagram of an image reader and UHF antenna box (100) from a printed-label-to-RFID tag data translation apparatus, in accordance with an embodiment of the invention. In a preferred embodiment of the invention, the image reader and UHF antenna box (100) comprises a box casing (101), one or more image readers (103, 105, 107), and one or more UHF antenna modules (113, 115, 117). In addition, in the preferred embodiment of the invention, the image reader and UHF antenna box (100) also contains one or more rear RF absorber pads (121, 123), side RF absorber pads (125), and bottom RF absorber pads (109).

In a preferred embodiment of the invention, each image reader (103, 105, or 107) is configured to scan printed information (e.g. a barcode, a QR code, an alphanumeric code, and/or another image) on a surface of a particular RFID tag (AB001, AB002, or AB003). The image reader (103, 105, or 107) can convert the printed information to some form of electronic data and transmit the electronic data to another logical unit, such as a computer or another hardware device, for further processing, transformation, and/or storage of the electronic data. In the preferred embodiment of the invention, an application program executed on a CPU and a memory unit of a computer operatively connected to an image reader (103, 105, or 107) can transform a raw form of electronic data transmitted form the image reader (103, 105, or 107) to a string of alphanumeric characters or other standardized form of electronic data by using an optical character recognition process and/or a bar code/QR code interpretation processes. In another embodiment of the invention, the image reader (103, 105, or 107) may have integrated logical blocks which can derive a final transformation of the electronic data on its own, without relying on the application program executed on a computer. In one or more embodiments of the invention, the final transformation of the electronic data is storable inside a non-volatile memory unit of an RFID tag. The data initialization of an RFID tag often involves at least partial transcription of printed information on a printed label on a surface of the RFID tag into a non-volatile memory unit of the RFID tag, as illustrated and described for FIG. 5.

Furthermore, in one embodiment of the invention, the various RF absorber pads (e.g. 121, 123, 125, and 109) can reduce crosstalk and erroneous reading or writing operations from a plurality of UHF antenna modules (113, 115, 117), when one of the UHF antenna modules attempt to read data from or write data to an RFID tag positioned directly underneath. For example, when a middle UHF antenna module (115) sends a signal to a middle RFID tag (AB002) directly underneath for a reading or writing operation, the various RF absorber pads (e.g. 121, 123, 125, and 109) on a rear wall, left and right sidewalls, and a rear surface underneath a tag-holding plate (119) can prevent or reduce crosstalk and erroneous read or write to other RFID tags (AB001, AB003) nearby in left and right compartments.

Furthermore, in a preferred embodiment of the invention, a received signal strength indicator (RSSI) algorithm may be utilized to minimize chances of an erroneous write operation to another RFID tag near a targeted RFID tag during a transmission of a data write instruction to a non-volatile storage inside the targeted RFID tag. In one embodiment of the invention, the RSSI algorithm improves the accuracy of data translation for an RFID tag by performing relative signal strength calculations between a particular UHF antenna module and several RFID tags nearby. For example, the RSSI algorithm for the middle UHF antenna module (115) may calculate a first relative signal strength returned from a target RFID tag (AB002), and compare the first relative signal strength against other relative signal strengths (e.g. the middle UHF antenna module (115) vs. a left RFID tag (AB001), and the middle antenna module (115) vs. a right RFID tag (AB003)). In this example, because AB001 and AB003 are further from the middle UHF antenna module (115), the first relative signal strength between the middle UHF antenna module (115) and the target RFID tag (AB002) is stronger than the other relative signal strengths with other RFID tags (i.e. AB001, AB003). The relative signal strengths are especially clear if RF absorber pads (e.g. 121, 123, 125, 109) are used to blunt or isolate RF signal propagation between different compartments of the box casing (101).

Continuing with FIG. 1, in the preferred embodiment of the invention, the tag-holding plate (119) is designed to be placed on top of a conveyor belt or another moving mechanism to make the tag-holding plate (119) to slide forward or backward relative to the box casing (101). In one embodiment of the invention, the tag-holding plate (109) has one or more tag slots (111) formed on the tag-holding plate (119) to place RFID tags. The conveyor belt or another moving mechanism is configured to mobilize the tag-holding plate (119) to bring an RFID tag (e.g. AB002) within an access range of an image reader (e.g. 105) and a UHF antenna module (e.g. 115).

In the preferred embodiment of the invention, the tag-holding plate (119) comprises three tag slots as a single "batch." As illustrated in FIG. 1, the single batch data initialization involves near-parallel or simultaneous printed label scanning and/or data write instructions to all three RFID tags (AB001, AB002, AB003) in one row for each completed movement of the conveyor belt or another moving mechanism to bring the single batch of RFID tags (AB001, AB002, AB003) within the access range of the image readers (103, 105, 107) and the UHF tag antenna modules (113, 115, 117). In another embodiment of the invention, a single batch may comprise more or less than three RFID tag slots for one row of a tag-holding plate. Yet in another embodiment of the invention, a single column of RFID tag slots may comprise a tag-holding plate instead of any batch processing of multiple RFID tags per row. In the preferred embodiment of the invention, the tag-holding plate (119) is made of transparent or translucent plastic materials with a multiple number of tag slots (e.g. 111), each of which is configured to hold an RFID tag firmly in place during motorized movements of a conveyor belt or another moving mechanism to slide the tag-holding plate (119) forward or backward.

Figure 2:
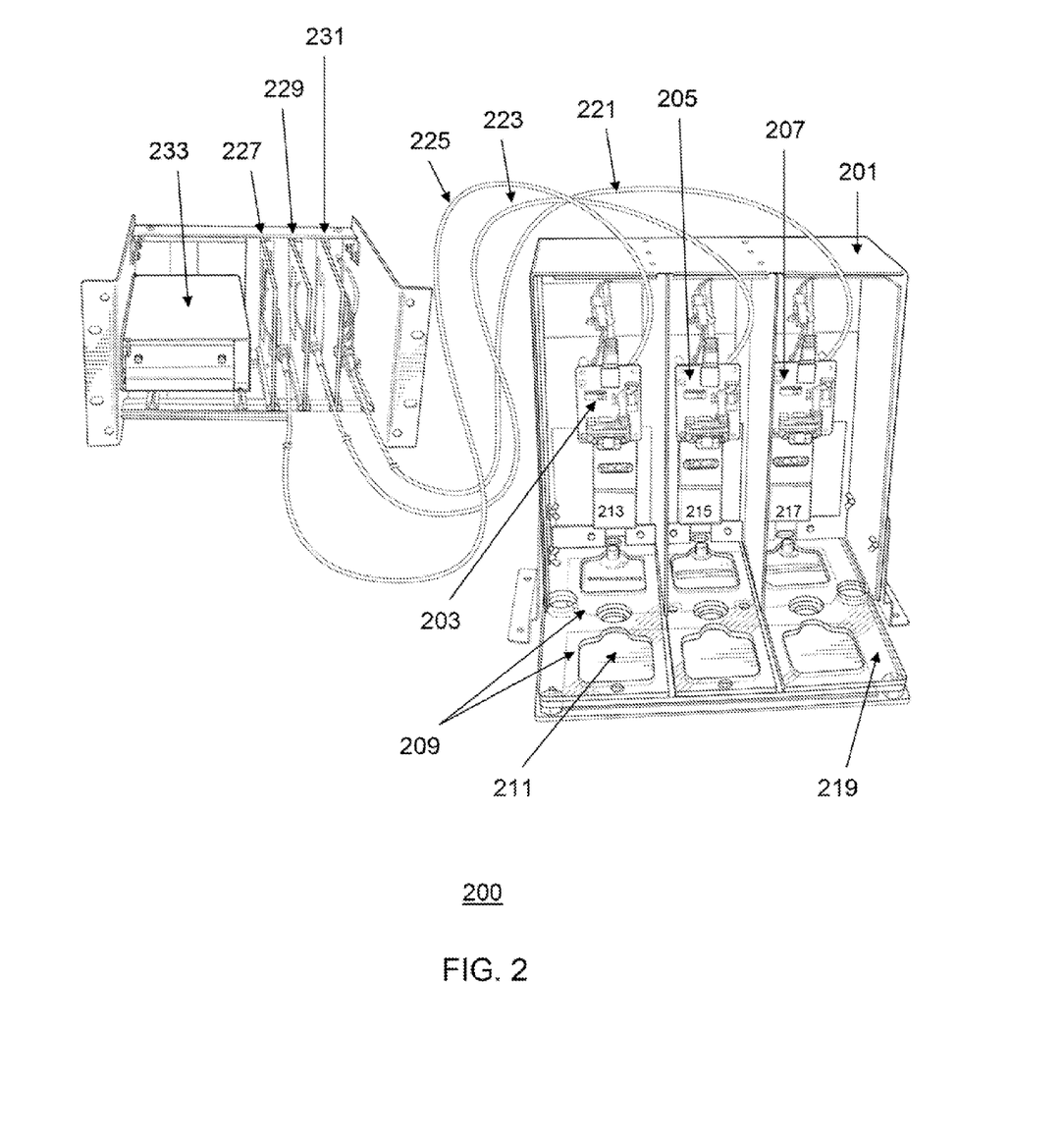
FIG. 2 shows a perspective diagram of an image reader and UHF antenna box and a controller box as part of a printed-label-to-RFID tag data translation apparatus, in accordance with an embodiment of the invention.

FIG. 2 shows a perspective diagram (200) of an image reader and UHF antenna box and a controller box as part of a printed-label-to-RFID tag data translation apparatus, in accordance with an embodiment of the invention. In a preferred embodiment of the invention, the image reader and UHF antenna box comprises a box casing (201) containing a plurality of compartments (i.e. left, middle, and right), each compartment of which carries an image reader (203, 205, or 207), a UHF antenna module (213, 215, or 217), and RF absorber pad materials (e.g. 209). In addition, a tag-holding plate (219) typically made of plastic is configured to slide forward or backward relative to the box casing (201) by using a conveyor belt or another moving mechanism. In the preferred embodiment of the invention, the tag-holding plate (219) contains multiple tag slots (e.g. 211) per row, and each row accommodates a "single batch" of RFID tags for data translation and initialization as a batch process.

Furthermore, in the preferred embodiment of the invention, the controller box comprises a plurality of UHF tag access modules (227, 229, 231), each of which is operatively connected to a corresponding UHF antenna module (213, 215, or 217) via a communication cable (225, 223, or 221), as illustrated in FIG. 2. In the preferred embodiment of the invention, a power supply unit (233) is operatively connected to the plurality of UHF tag access modules (227, 229, 231) and provides electrical power for operation of each module. In one or more embodiments of the invention, a UHF tag access module (227, 229, or 231) is configured to send a data write or read instruction to a non-volatile storage inside an RFID tag via a corresponding UHF antenna module (213, 215, or 217).

In the preferred embodiment of the invention, the data write instruction is used for transmission of at least a portion of electronic data or a transformed dataset of the electronic data to the non-volatile storage inside an RFID tag during a data translation and initialization process of the RFID tag, wherein the electronic data originates from an image reader (203, 205, or 207) scanning a printed label on a surface of the RFID tag.

Continuing with FIG. 2, in one embodiment of the invention, the printed-label-to-RFID tag data translation apparatus also includes a computer interface inside the controller box, wherein the computer interface is configure to route the electronic data and any other desirable data among the image readers (203, 205, 207), the UHF tag access modules (227, 229, 231), and a computer operatively connected to the controller box. In a preferred embodiment of the invention, the computer operatively connected to the controller box executes an application program on its CPU and a memory unit, and the application program is configured to control a particular behavior of the image readers (203, 205, 207), the computer interface, the UHF tag access modules (227, 229, 231), the UHF antenna modules (213, 215, 217), the conveyor belt, and/or the tag-holding plate (219). Examples of behaviors which the application program can control include, but are not limited to, turning the UHF tag access modules (227, 229, 231) on or off, instructing an image reader (203, 205, or 207) to scan a printed label of an RFID tag and to transmit scanned electronic data back to the computer, instructing a UHF tag access module (227, 229, or 231) to perform a data write or read instruction to a non-volatile storage inside the RFID tag, and activating the conveyor belt to move the tag-holding plate forward prior to processing of a particular batch of RFID tags (e.g. AB001, AB002, and AB003 of FIG. 1).

In one or more embodiments of the invention, the application program may also incorporate image recognition, optical character recognition, and/or another image recognition algorithms to further transform raw (i.e. scanned) electronic data from an image reader to a transformed dataset of the raw electronic data. In some embodiments of the invention, it may be desirable to use the transformed dataset of the raw electronic data for a data write instruction to a non-volatile storage inside an RFID tag, because the transformed dataset may be more compatible or more compact than the raw data from the image reader for storage in the RFID tag.

Continuing with FIG. 2, in a preferred embodiment of the invention, each of the UHF antenna modules (213, 215, 217) is located above the tag-holding plate (219). Furthermore, each of the UHF antenna modules (213, 215, 217) is configured to transmit a data write instruction or a data read instruction to a non-volatile storage inside an RFID tag, if such instructions are given by a corresponding UHF tag access module (227, 229, or 231) and/or an application program executed on a computer operatively connected to the corresponding UHF tag access module (227, 229, or 231).

Furthermore, in a preferred embodiment of the invention, a received signal strength indicator (RSSI) algorithm may be utilized to minimize chances of an erroneous write operation to another RFID tag near a targeted RFID tag during a transmission of a data write instruction to a non-volatile storage inside the targeted RFID tag. In one embodiment of the invention, the RSSI algorithm improves the accuracy of data translation for an RFID tag by performing relative signal strength calculations between a particular UHF antenna module and several RFID tags nearby. For example, in FIG. 2, the RSSI algorithm for the leftmost UHF antenna module (213) may calculate a first relative signal strength returned from a target RFID tag (i.e. leftmost RFID tag under the leftmost UHF antenna module (213)), and compare the first relative signal strength against other relative signal strengths (e.g. the leftmost UHF antenna module (213) vs. a middle RFID tag, and the leftmost antenna module (213) vs. a rightmost RFID tag). In this example, because the middle RFID tag and the rightmost RFID tag are further from the leftmost UHF antenna module (213), the first relative signal strength between the leftmost UHF antenna module (213) and the leftmost RFID tag is stronger than the other relative signal strengths with other READ tags. The relative signal strengths are especially clear if RF absorber pads (e.g. 209 and etc.) are used to blunt or isolate RF signal propagation between different compartments of the box casing (201).

Figure 3:
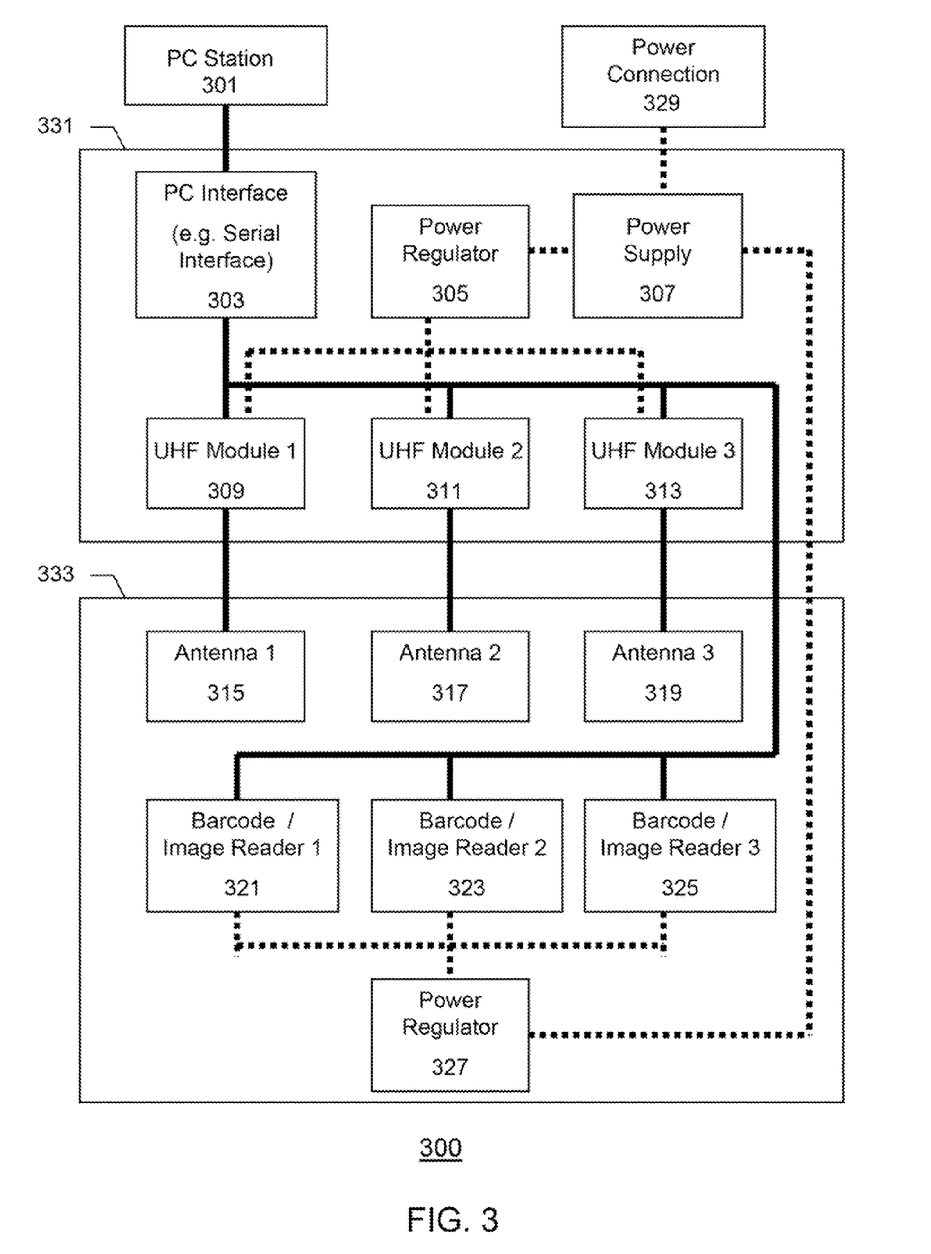
FIG. 3 shows a system block diagram of a printed-label-to-RFID tag data translation apparatus, in accordance with an embodiment of the invention.

FIG. 3 shows a system block diagram (300) of a printed-label-to-RFID tag data translation apparatus, in accordance with an embodiment of the invention. In a preferred embodiment of the invention, the printed-label-to-RFID tag data translation apparatus comprises a PC station (301), a controller box (331), an image reader and UHF antenna box (333), and an electrical power connection (329). Furthermore, in the preferred embodiment of the invention, the controller box (331) comprises a PC interface (303), a plurality of UHF tag access modules (309, 311, 313) operatively connected to the PC interface (303), a power regulator (305) operatively connected to the plurality of UHF tag access modules (309, 311, 313), and a power supply (307) operatively connected to the power regulator (305). Furthermore, in one embodiment of the invention, the power supply (307) is also operatively connected to an external electrical power connection (329), such as an electrical outlet, an external battery, or an electrical generator.

Furthermore, in a preferred embodiment of the invention, the image reader and UHF antenna box (333) comprises a plurality of UHF antenna modules (315, 317, 319) operatively connected to the plurality of corresponding UHF tag access modules (309, 311, 313). In addition, the image reader and UHF antenna box (333) also includes a plurality of barcode/image readers (321, 323, 325) which are operatively connected to the PC interface (303). In one embodiment of the invention, the plurality of barcode/image readers (321, 323, 325) may also be operatively connected to a power regulator (327), which is operatively connected to the power supply (307). In another embodiment of the invention, the image reader and UHF antenna box (333) may contain a separate power supply unit and/or a separate power connection without any electrical power supply dependence on the controller box (331).

Continuing with FIG. 3, in a preferred embodiment of the invention, each of the plurality of barcode/image readers (321, 323, 325) are configured to scan printed information on a surface of a particular RFID tag to convert the printed information to electronic data. In one embodiment of the invention, the printed information is a barcode, a QR code, an alphanumeric code, and/or another printed image on the surface of the particular RFID tag.

Furthermore, the PC interface (303) is operatively connected to the barcode/image readers (321, 323, 325) and the PC station (301). The PC interface (303) is also configured to route the electronic data and any other desirable data among a particular barcode/image reader (321, 323, or 325), the PC station (301), and/or a particular UHF tag access module (309, 311, or 313). In a preferred embodiment of the invention, the PC interface (303) is a multi.RS232 serial interface.

In the preferred embodiment of the invention, UHF tag access module (309, 311, or 313) is operatively connected to a UHF antenna module (315, 317, or 319), wherein the UHF tag access module (309, 311, or 313) is configured to send a data write instruction to a non-volatile storage inside the particular RFID tag via the UHF antenna module (315, 317, or 319). The data write instruction may be used for transmission of at least a portion of the electronic data or a transformed dataset of the electronic data from the image reader (321, 323, or 325) and/or the PC station (i.e. a computer).

Furthermore, in one embodiment of the invention, a tag-holding plate configured to hold the particular RFID tag in a tag slot can be placed on a conveyor belt, and the particular RFID tag can be brought within an access range of the image reader (321, 323, or 325) and the UHF tag antenna module (315, 317, or 319) by activating the conveyor belt. In one embodiment of the invention, the UHF antenna module (315, 317, or 319 is located above the tag-holding plate, wherein the UHF antenna module (315, 317, or 319) is configured to transmit the data write instruction to the non-volatile storage inside the particular RFID tag. The UHF antenna module (315, 317, or 319) is also configured to receive some data from the particular RFID tag in case of a data read instruction.

Continuing with FIG. 3, the PC station (301) is configured to execute an application program on its CPU and a memory unit, wherein the application program is configured to control a particular behavior of a component in the controller box (331) and/or the image reader and UHF antenna box (333), as previously described for FIG. 2. Furthermore, in one embodiment of the invention, each of the UHF tag access modules (309, 311, 313), each of the UHF antenna modules (315, 317, 319), and the application program executed on the CPU and the memory unit of the PC station (301) may utilize a received signal strength indicator (RSSI) algorithm to minimize chances of an erroneous write to another RFID tag near the particular RFID tag during a transmission of the data write instruction to the non-volatile storage inside the particular RFID tag.

In addition, in some embodiments of the invention, the application program executed on the CPU and the memory unit of the PC station (301) may also utilize barcode image recognition, optical character recognition, and/or another image recognition algorithm to convert the raw scanned information from an image reader (321, 323, or 325) to a transformed dataset of the electronic data, which is easily writable to the non-volatile storage inside the particular RFID tag. In an alternate embodiment of the invention, the image reader (321, 323, or 325) itself may utilize the barcode image recognition, the optical character recognition, and/or another image recognition algorithm from the application program to produce electronic data which do not require further data transformation.

Moreover, in one embodiment of the invention, the time duration for operating the printed label-to-RFID tag data translation apparatus to complete an RFID data translation per RFID tag may be less than ten seconds. In another embodiment of the invention, the time duration for operating the printed label-to-RFID tag data translation apparatus to complete RFID data translations per a batch of RFID tags (e.g. a batch of three RFID tags) may be less than ten seconds.

Figure 4:
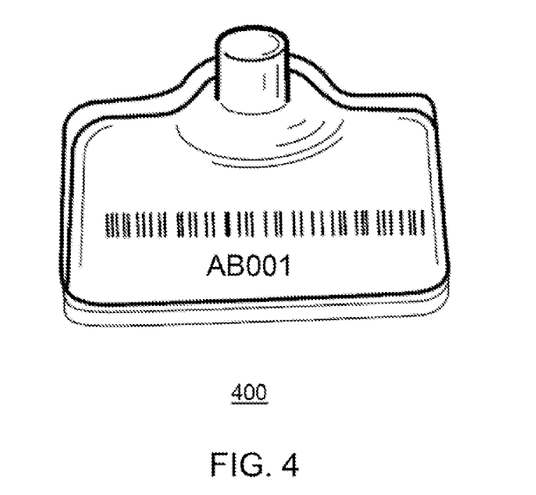
FIG. 4 shows an example of an RFID tag with a printed label including a bar code and an identifying code on a surface of the RFID tag, in accordance with an embodiment of the invention.

FIG. 4 shows an example of an RFID tag (400) with a printed label including a bar code and an identifying code (i.e. "AB001") on a surface of the RFID tag (400), in accordance with an embodiment of the invention. In one embodiment of the invention, the printed label may be operatively attached to a surface of the RFID tag (400). Alternatively, in another embodiment of the invention, the printed label may be directly printed on a surface of the RFID tag (400) as a silkscreen. The RFID tag (400) can be used in a variety of animals or agricultural produce as a form of identification and information storage.

In a preferred embodiment of the invention, the RFID tag (400) is a battery-less (i.e. free of battery) "passive" tag, which comprises a non-volatile storage unit and an RF antenna encapsulated by a weather-resistant covering. In one embodiment of the invention, the RF antenna in the RFID tag (400) is configured to receive an electromagnetic signal from an UHF antenna module of the printed label-to-RFID tag data translation apparatus to energize the non-volatile storage unit inside the RFID tag (400) to transmit information from or send information to the non-volatile storage unit. Typically, the process of energizing the non-volatile storage unit inside a passive RFID tag involves electromagnetic induction. In UHF-based passive RFID tags, it is possible to achieve tag read and write functions up to several meters away from a UHF antenna module, unlike LF-based RFID tags which exhibit shorter access distance from corresponding LF antenna modules.

In another embodiment of the invention, the RFID tag (400) may be a battery-powered "active" tag. Furthermore, the RFID tag (400) may also combine the functions of a location beacon (e.g. a GPS beacon), which may be active or passive in its integrated tag design.

In the preferred embodiment of the invention, the RFID tag (400) also has an attachment pin mechanism to enable a secure attachment of RFID tag to a tagged object, such as a body part of an animal or agricultural produce boxes or packages. Furthermore, the weather-resistant covering encapsulating the RFID tag (400) is generally made of sturdy plastic, rubber, and/or other synthetic materials which are non-poisonous for use with edible livestock.

Figure 5:
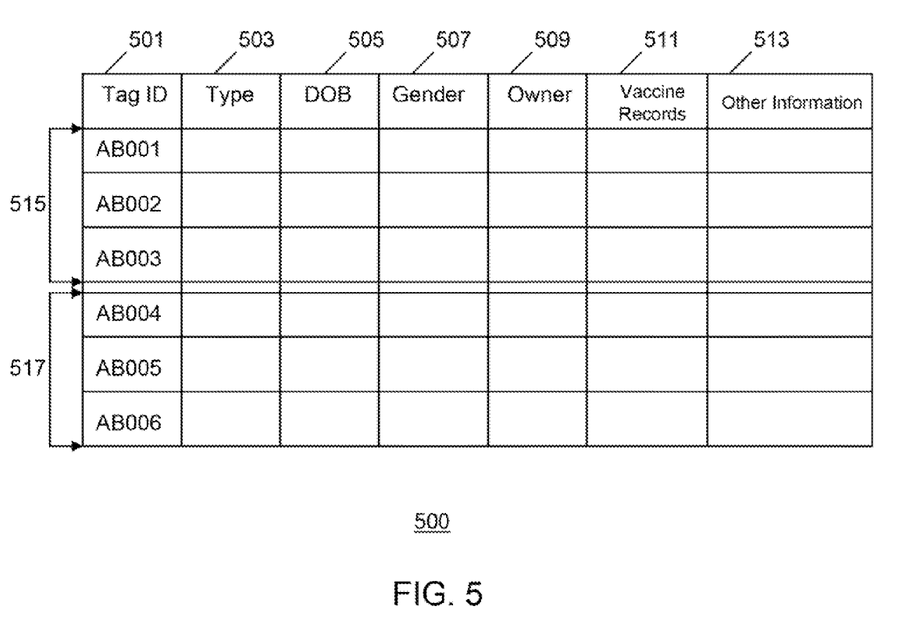
FIG. 5 shows a conceptual representation of data initialization for batches of RFID tags, in accordance with an embodiment of the invention.

FIG. 5 shows a conceptual representation (500) of data initialization for several batches of RFID tags, in accordance with an embodiment of the invention. In a preferred embodiment of the invention, a "batch" may comprise three RFID tags per row in a tag-holding plate, as illustrated by three RFID tags (AB001, AB002, and AB003) per row in FIG. 1. FIG. 5 shows two batches (515, 517) of RFID tags, with each batch comprising three RFID tags (i.e. AB001~AB003 for the first batch, and AB004~AB006 for the second batch).

In a preferred embodiment of the invention, the data initialization of each RFID tag (e.g. AB001, AB002, and etc.) involves at least some partial data transcription, conversion, and/or translation from printed information on a surface of each RFID tag (e.g. AB001, AB002, and etc.) to electronic data storable in each RFID tag. For example, if an RFID tag has "AB001" and a unique bar code printed on top of its surface, the printed label-to-RFID tag data translation apparatus may use its image reader to scan "AB001" and the unique bar code, and further transform the scanned electronic data from the image reader using a barcode recognition algorithm, an optical character recognition, and/or any other image recognition algorithms to derive a transformed dataset of the scanned electronic data, wherein the transformed dataset is more suitable for data storage in a non-volatile storage inside an RFID tag.

In one embodiment of the invention, as shown in FIG. 5, RFID tags are designed to be used for animals at a livestock farm. In this embodiment, a Tag ID (501) is a unique tag identification code designed to identify a particular animal among a plurality of animals. In this particular example, the printed label-to-RFID tag data translation apparatus, as disclosed in various embodiments of the present invention, can either entirely or mostly automate the data initialization process of translating, transcribing, and/or converting a government-issued unique identifying code (e.g. in form of a barcode, a QR code, an alphanumeric code, and etc.) attached to or printed on a surface of each RFID tag into electronic data, which is storable in the non-volatile storage of each RFID tag. In a preferred embodiment of the invention, a batch process, or an act of initializing a batch (e.g. 515, 517) of RFID tags nearly at the same time as a group, makes this data initialization process even more speedy and efficient, compared to conventional one-by-one manual data entry for initialization of RFID tags.

In the embodiment disclosed in FIG. 5, the Tag ID (501) for a particular animal is also typically associated with other pieces of information, such as a type/grade of each animal (503), date of birth (505), gender (507), owner (509), vaccine records (511), and other information (513) for the particular animal. Depending on a user preference, in some embodiments of the invention, it may also be desirable to assign or place initial values for at least some of these data categories (e.g. 503, 505, 507, 509, 511, 513) during the data initialization process of each RFID tag using the printed label-to-RFID tag data translation apparatus.

Figure 6:
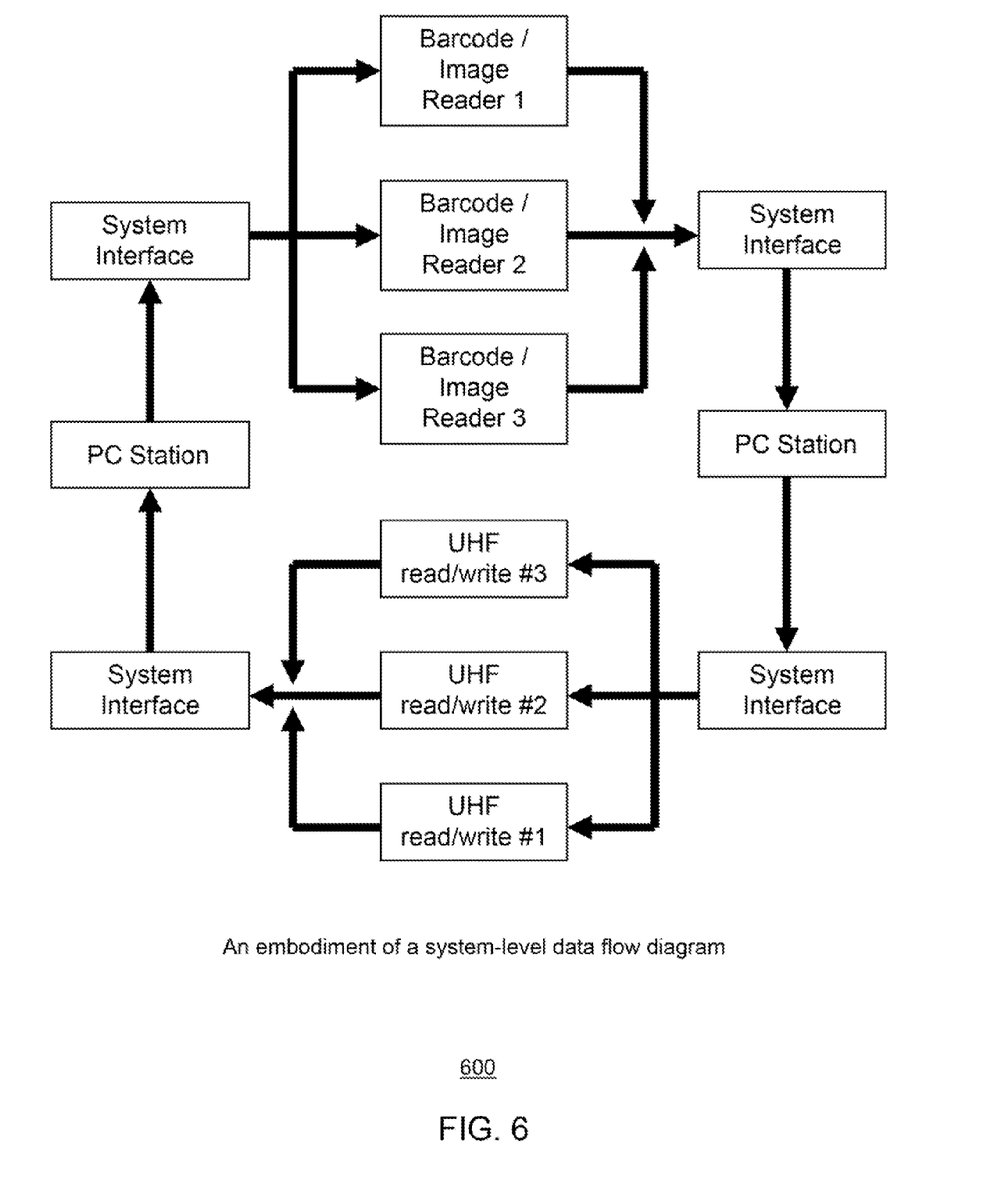
FIG. 6 shows an example of a system-level data flow diagram of a printed-label-to-RFID tag data translation apparatus when a system interface is used, in accordance with an embodiment of the invention.

FIG. 6 shows an example of a system-level data flow diagram (600) when a system interface and a PC station are used for a printed-label-to-RFID tag data translation apparatus, in accordance with an embodiment of the invention. In a preferred embodiment of the invention, serial RS232 interfaces and ports may be used for UHF tag access modules and image readers. In the preferred embodiment of the invention, a typical serial RS232 interfaces can transmit up to 115200 bits per second (bps). Furthermore, each image reader may simply be a bar code reader in some embodiments of the invention, or a more generic image-scanning reader capable of scanning any printed images in some other embodiments of the invention. In one embodiment of the invention, each UHF tag access module may have a center frequency of 905 MHz, with a maximum power output of 30 dBm. Furthermore, in some embodiments of the invention, each UHF tag access module is operatively connected to an UHF antenna module. In one embodiment of the invention, the UHF antenna module may operate best between 860 MHz~960 MHz.

The example shown in FIG. 6 illustrates how a printed label-to-RFD tag data translation apparatus with three UHF tag access modules and three image readers can operate at a system level. First, a computer (e.g. PC station) may send an instruction to a system interface (e.g. Serial RS232 interface) to use all three image readers (e.g. barcode/image reader 1~barcode image reader 3) for scanning three corresponding printed labels on three RFID tags in parallel or nearly simultaneously. Then, in case of using a system interface such as the RS232 interface, the three image readers (e.g. barcode/image reader 1~barcode image reader 3) can simultaneously scan the three printed labels (e.g. barcode, QR code, alphanumeric code, and etc.) on the three RFID tags in parallel or nearly in parallel. Then, the scanned electronic data are transmitted to the computer (e.g. PC station) via the system interface, as shown in FIG. 6. In some instances, this scanned electronic data may be further converted or transformed into a data format more compatible for writing into a non-volatile storage of an RFID tag. If the computer (e.g. PC station) is instructed by a user or is programmed to initialize all three RFID tags using at least some portion of the scanned electronic data or its converted/transformed data formats, then the computer instructs three corresponding UHF tag access modules (e.g. UHF read/write #1~UHF read/write #3) via the system interface to conduct data write instructions to each of the three RFID tags in parallel or nearly in parallel, as shown in FIG. 6, wherein the content of the written data is at least some portion of the scanned electronic data or its converted/transformed data formats. In some embodiments of the invention, the results of the data write instructions may be reported back to the computer via the system interface, as shown in FIG. 6.

As shown by the system-level data flow diagram for an embodiment of the invention in FIG. 6, it may be desirable to operate this printed label-to-RFID tag data translation apparatus in an entirely-automated or largely-automated manner, as a tag-holding plate carrying a plurality of RFID tags continues to advance to a next batch on a conveyor belt, which can be controlled by an application software executed on a CPU and a memory unit of the computer (e.g. PC station). In another embodiment of the invention, a user may want to control at least some steps within the system-level data flow for manual adjustments of the data translation and initialization process for each batch. Furthermore, in another embodiment of the invention, it may be desirable to use a parallel system interface instead of a serial system interface (e.g. Serial RS232 interface), which may remove any unnecessary serialized instruction and data transmission patterns for enabling printed label scanning processes and data read/write processes in RFID tags.

Figure 7:
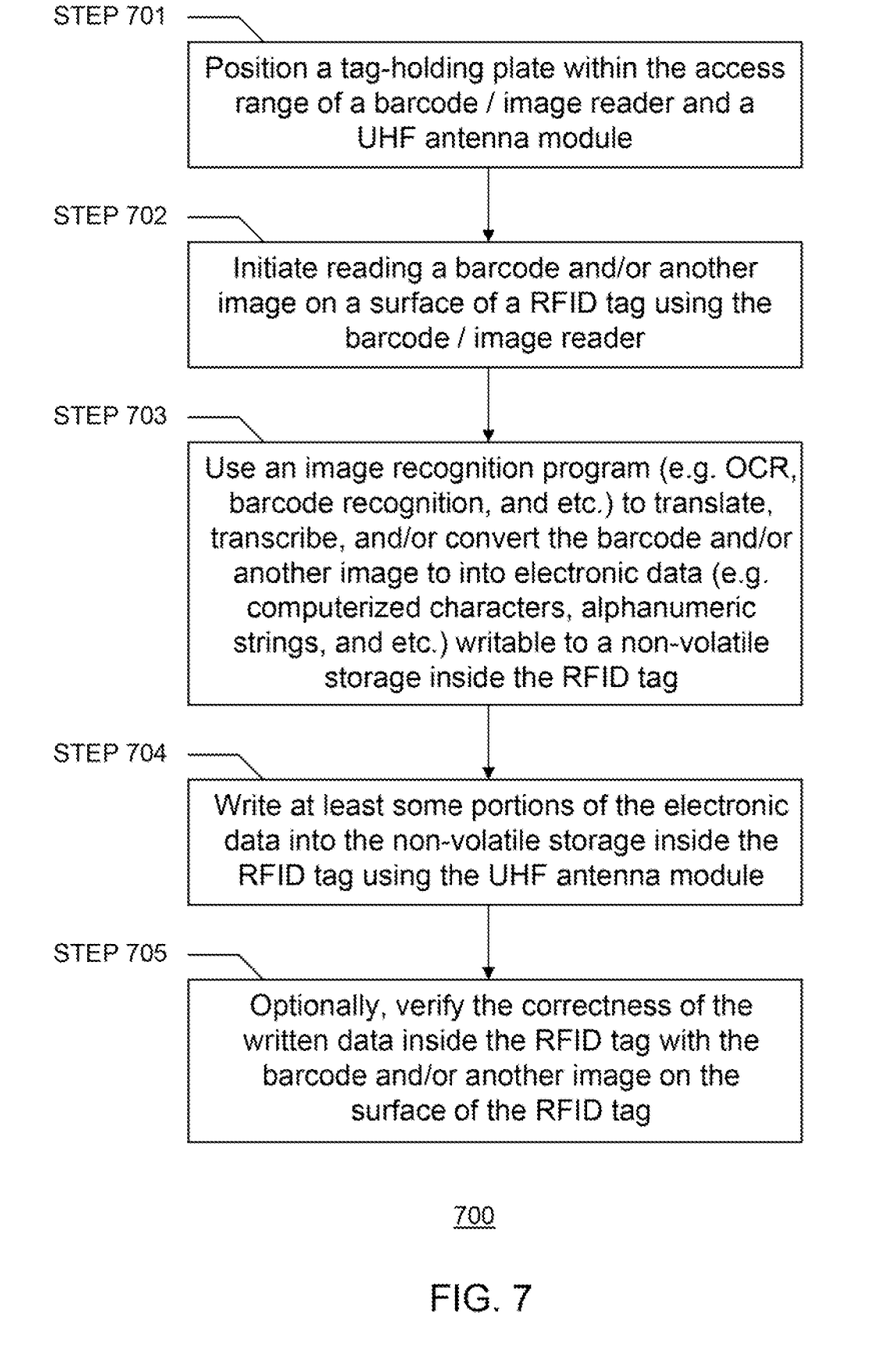
FIG. 7 shows a method of translating a printed label to electronic data storable inside an RFID tag, in accordance with an embodiment of the invention.

FIG. 7 shows a method (700) of translating a printed label to electronic data storable inside an RFID tag, in accordance with an embodiment of the invention. In a preferred embodiment of the invention, a tag-holding plate is mobilized and positioned within an access range of an image reader and a UHF antenna module, as shown in STEP 701. In a preferred embodiment of the invention, the tag-holding plate is mobilized and positioned by a conveyor belt or another moving mechanism controlled by a printed label-to-RFID tag data translation apparatus. Then, scanning (i.e. reading) of a printed label on a surface of a particular RFID tag is performed by activating the image reader, as shown in STEP 702. The image reader may simply be a bar code reader in some embodiments, or the image reader may be a more generic image reader capable of scanning many types of printed images, such as QR codes, alphanumeric codes, and other printed information.

Optionally, the scanned electronic data from the image reader is transmitted to a computer operatively connected to the image reader, and an image recognition program (e.g. optical character recognition (OCR), barcode recognition, and etc.) operating in the computer is utilized to process and/or convert the scanned electronic data to generate a transformed dataset of the scanned electronic data, or a subset of the scanned electronic data, wherein the transformed dataset or the subset of the scanned electronic data are more desirable for a data write operation to a non-volatile storage inside the particular RFID tag, as shown in STEP 703.

Continuing with FIG. 7, the non-volatile storage inside the RFID tag can receive at least some portions of the transformed dataset or the subset of the scanned electronic data with a data write operation using an UHF antenna module, as shown in STEP 704. Optionally, the printed label-to-RFID tag data translation apparatus may verify correctness of the written data inside the RFID tag with information originally available on a printed label or other sources of data verification, as shown in STEP 705.

Various embodiments of the present invention may provide several advantages over conventional manual procedures for RFID tag initialization. A printed label-to-RFID tag data translation apparatus in accordance with an embodiment of the present invention enables largely-automated, seamless, and high-volume batch data initialization process for a large number of RFID tags. For example, instead of attempting to initialize each RFID tag one by one in a manual data entry process for initial assignment of tag identification numbers, various embodiments of the present invention allow a tag-holding plate full of RFID tags on a conveyor belt or another moving mechanism to be processed rapidly.

Furthermore, by using one or more image readers to scan printed labels digitally, and by using one or more UHF tag access modules and UHF antenna modules to perform a data write instruction to a non-volatile storage unit of an RFID tag, this apparatus largely automates printed label translation or transcription processes for data initialization of RFID tags. In addition, most steps or all steps during the data initialization of RFID tags may be automatically controlled by an application program executed on a computer, thereby saving costs and time for a user who needs to utilize a large number of RFID tags with correctly-initialized data in their respective non-volatile storage units.

Moreover, by using a received signal strength indicator (RSSI) algorithm to minimize chances of an erroneous write operation to another RFID tag near a targeted RFID tag during a transmission of a data write instruction to a non-volatile storage inside the targeted RFID tag, various embodiments of the present invention are able to achieve a very high level of data translation or transcription accuracies. In addition, the use of RF absorber pads in the image reader and UHF antenna box further improves the accuracy of the data translation for RFID tags in various embodiments of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for printed label-to-RFID tag data translation, the apparatus comprising:
    an image reader configured to scan printed information on a surface of a particular RFID tag to convert and transcribe the printed information to electronic data, wherein the electronic data are identical electronic transcriptions of the printed information on the surface of the particular RFID tag;
    a computer interface operatively connected to the image reader, a UHF tag access module, and a computer to route the electronic data among the image reader, the computer, and the UHF tag access module;
    the UHF tag access module operatively connected to a UHF antenna module, wherein the UHF tag access module provides a literal electronic transcription of the printed information by sending a data write instruction with the electronic data that are identical electronic transcriptions of the printed information to a non-volatile storage inside the particular RFID tag via the UHF antenna module, wherein the literal electronic transcription of the printed information does not retrieve or add any information from a database of the computer, and wherein the electronic data are identical electronic transcriptions of the printed information;
    a tag-holding plate embedding a bottom RF absorber pad to form a combined plate structure that holds the particular RFID tag in a tag slot formed on a top surface of the combined plate structure, wherein the combined plate structure is removably and portably placed on a conveyor belt, and wherein the tag slot is brought within an access range of the image reader and the UHF tag antenna module by activating the conveyor belt;
    the UHF antenna module located above the conveyor belt, wherein the UHF antenna module is configured to transmit the data write instruction to the non-volatile storage inside the particular RFID tag, and is also configured to receive some data from the particular RFID tag in case of a data read instruction; and
    the computer executing an application program on a CPU and a memory unit in the computer, wherein the application program is configured to control a particular behavior of at least one of the image reader, the computer interface, UHF tag access module, the conveyer belt, and the UHF antenna module.

2. The apparatus of claim 1, further comprising a power supply unit and a power regulator, wherein the power supply unit supplies power to the image reader, the UHF tag access module, and the computer interface, and wherein the power regulator provides electrical current and voltage stability and power surge protection.

3. The apparatus of claim 2, wherein the image reader and the UHF antenna module are contained in an image reader and UHF antenna box, and wherein the UHF tag access module, the power supply unit, the power regulator, and the computer interface are contained in a controller box.

4. The apparatus of claim 1, wherein the printed information is a barcode, a QR code, an alphanumeric code, or another image on the surface of the particular RFID tag.

5. The apparatus of claim 1, wherein the UHF tag access module, the UHF antenna module, and the application program executed on the CPU and the memory unit of the computer utilize a received signal strength indicator (RSSI) algorithm to minimize chances of an erroneous write to another RFID tag near the particular RFID tag during a transmission of the data write instruction to the non-volatile storage inside the particular RFID tag.

6. The apparatus of claim 5, wherein the RSSI algorithm involves calculating a first relative signal strength returned from the particular RFID tag to the UHF antenna module, and a second relative signal strength returned from another RFID tag nearby to the UHF antenna module, and thereafter initiating the data write instruction only to the particular RFID tag because its first relative signal strength is greater than the second relative signal strength returned from another RFID tag.

7. The apparatus of claim 1, further comprising a rear RF absorber pad behind the UHF antenna module, and a side RF absorber pad next to the UHF antenna module, wherein the rear absorber pad and the side RF absorber pad reduce RF interferences between the UHF antenna module and another UHF antenna module nearby during a data reading or data writing procedure to the particular RFID tag.

8. The apparatus of claim 1, wherein the computer interface is a multi.RS232 serial interface.

9. The apparatus of claim 1, wherein a time duration for operating the apparatus to complete the printed label-to-RFID tag data translation takes less than ten seconds per RFID tag.

10. The apparatus of claim 1, wherein the scanning of the printed information using the image reader and optionally further processed by the application program executed on the CPU and the memory unit of the computer utilizes barcode image recognition, optical character recognition, or another image recognition to convert the printed information to the electronic data.

11. The apparatus of claim 1, wherein the particular RFID tag is a passive tag without an internal battery.

12. The apparatus of claim 1, wherein the UHF antenna module transmitting the data write instruction to the non-volatile storage inside the particular RFID tag involves energizing the particular RFID tag by electromagnetic induction to enable writing into the non-volatile storage inside the particular RFID tag.

13. The apparatus of claim 1, wherein the combined plate structure contains a plurality of tag slots with three tag slots per row for high-volume batch processing of printed label-to-RFID tag data translations in a plurality of RFID tags placed in the plurality of tag slots.

14. A method of translating a printed label to electronic data stored inside a particular RFID tag, the method comprising steps of:
- embedding a bottom RF absorber pad in a tag-holding plate to form a combined plate structure that holds the particular RFID tag in a tag slot formed on a top surface of the combined plate structure;
- placing the combined plate structure on top of a conveyor belt, wherein the combined plate structure is portable, removable, and is not a physical structure of the conveyor belt;
- positioning the combined plate structure within an access range of an image reader and a UHF antenna module by mobilizing the conveyor belt;
- initiating scanning of a printed label on a surface of the particular RFID tag placed in the tag slot on the combined plate structure by activating the image reader;
- transmitting scanned data from the image reader to a computer operatively connected to the image reader;
- using an image recognition program executing on a CPU and a memory unit of the computer to convert and transcribe the scanned data to generate electronic data writable to a non-volatile storage inside the particular RFID tag, wherein the electronic data are identical and literal electronic transcriptions of printed information without any retrieved data added from a database of the computer; and
- writing the electronic data into the non-volatile storage inside the particular RFID tag using a UHF tag access module and the UHF antenna module.

15. The method of claim 14, further comprising a step of verifying correctness of the written data inside the particular RFID tag with the printed label on the surface of the particular RFID tag.

16. The method of claim 14, wherein the step of writing at least some portions of the electronic data into the non-volatile storage inside the particular RFID tag also utilizes a received signal strength indicator (RSSI) algorithm to minimize chances of an erroneous write to another RFID tag nearby.

17. The method of claim 16, wherein the RSSI algorithm involves calculating a first relative signal strength returned from the particular RFID tag to the UHF antenna module, and a second relative signal strength returned from another RFID tag nearby to the UHF antenna module, and thereafter initiating a data write instruction only to the particular RFID tag because its first relative signal strength is greater than the second relative signal strength returned from another RFID tag.

18. The method of claim 14, wherein the particular RFID tag is a passive tag without an internal battery.

19. The method of claim 14, wherein the step of writing at least some portions of the electronic data into the non-volatile storage inside the particular RFID tag using a UHF tag access module and the UHF antenna module involves energizing the particular RFID tag with electromagnetic induction to enable writing into the non-volatile storage inside the particular RFID tag.

* * * * *